Patented July 18, 1939

2,166,198

UNITED STATES PATENT OFFICE 2,166,198

CHEMICAL COMPOUNDS

Wilfred Archibald Sexton, Blackley, Manchester, England, assignor to Imperial Chemical Industries Limited, a corporation of Great Britain No Drawing. Application November 11, 1935, Serial No. 49,321. In Great Britain November 14, 1934

5 Claims. (Cl. 260—309)

This invention relates to the manufacture of new intermediate compounds for the preparation of dyestuffs.

According to the invention we make the said new dyestuff intermediate compounds by reacting an alkoylacetic or aroylacetic ester with an o-diamine of the benzene series in an inert solvent medium, and in the presence of a small amount of an alkaline reagent, as a catalyst. Alternatively, we make the said new compounds by reducing an aroylacetic- or alkoylacetic-o-nitroarylamide of the benzene series under acid conditions.

Ladenburg (Berichte, 1879, 12, 953) reacted together o-tolylenediamine and ethylacetoacetate without a solvent medium. He obtained a product (M. P. 82° C.) to which he ascribed the formula

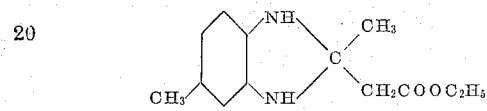

Similarly by reacting o-phenylene diamine with ethylacetoacetate, Hinsberg, and Koller (Berichte, 1896, 29, 1500) obtained a product (M. P. 85° C.) to which they ascribed the formula

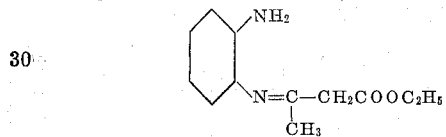

Further Beilstein (Handbuch der Organischen Chemie, 4th Supplementary vol. to 3rd edn., p. 405) states that by reacting o-tolylenediamine with ethylacetoacetate, methylamino-α-hydroxylepidine is obtained.

We have now found that by reacting an o-diamine of the benzene series with an alkoylacetic or aroylacetic ester in an inert solvent and in the presence of an alkaline catalyst we obtain, in good yields, new compounds with very different properties from the known compounds mentioned above. By an inert solvent we mean a solvent which does not react with the reagents used in the invention. Suitable solvents are, for example, toluene, xylene, chlorobenzene, or nitrobenzene. Suitable alkaline reagents for use as catalysts in the reaction of the present invention are, for example, caustic soda, sodium carbonate or piperidine. The new compounds may also be obtained by acid reduction of alkoylacetic- or aroylacetic-o-nitroarylamides. Suitable o-nitroarylamides are, for example, acetoacetic-2-nitro-4-toluidide, acetoacetic-2-nitroanilide, acetoacetic-2-nitro-4-chloroanilide, benzoylacetic-2-nitro-4-toluidide or benzoylacetic-2-nitroanilide.

We believe the new compounds of the present invention to be benziminazole derivatives. For instance, the compound obtained by reacting o-tolylenediamine with ethylacetoacetate under the hereinbefore defined conditions has probably the formula

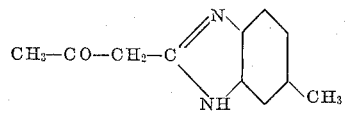

Ethyl alcohol and water are liberated during the reaction.

The new compounds are valuable intermediates for the preparation of dyestuffs. The new compounds dissolve in dilute sodium hydroxide and couple readily with diazo- or tetrazo compounds to form azo compounds. They are thus useful for the preparation of azo dyestuffs and pigments.

The following examples, in which the parts are by weight, illustrate but do not limit the invention.

Example 1

21.6 parts of o-phenylenediamine dissolved in 200 parts of xylene are treated with 1 part $$\frac{N}{2}$$

alcoholic caustic soda. The solution is boiled under reflux and a mixture of 25.6 parts of ethyl acetoacetate with 20 parts of xylene are added during ½ hour. The mixture is then boiled for 1 hour during which time 50–60 parts of liquid are allowed to distil off. On cooling, 2-acetonyl-benziminazole crystallises out in good yield M. P. 147°. It dissolves readily in dilute mineral acid and in caustic alkali.

Example 2

If the o-phenylenediamine of Example 1 is replaced by 24.4 parts of 1:3:4-tolylenediamine, there is formed 2-acetonyl-5-methylbenziminazole M. P. 155°. Recrystallisation from toluene gives M. P. 156°.

Example 3

If the o-phenylenediamine of Example 1 is replaced by 28.5 parts of 1:3:4-chloro-o-phenylenediamine there is formed 2-acetonyl-5-chlorobenziminazole. This on recrystallisation has M. P. 170°.

*Example 4*

If in Example 2, the ethyl acetoacetate is replaced by 36.0 parts of ethyl benzoylacetate there is formed 2-phenacyl-5-methylbenziminazole M. P. 193°.

*Example 5*

A mixture of alcohol (250 parts), water (25 parts), 2N hydrochloric acid (3 parts) and iron (100 parts) is stirred at the boil. 43 parts of acetoacet-2-nitro-4-toluidide (made by condensation of ethyl acetoacetate with 3-nitro-4-toluidine) are now added and the whole boiled for 15 hours. After neutralisation, the alcoholic liquor is filtered from the iron oxide and evaporated to dryness. Recrystallisation of the residue from benzene gives 2-acetonyl-6-methylbenziminazole M. P. 176-7°. Repeated recrystallisation from benzene raises this to 184°.

*Example 6*

24.4 parts of 3:4-diaminotoluene are dissolved in hot xylene (200 parts) and 0.25 part of sodium carbonate added. The solution is boiled gently under reflux whilst stirring, and during ½ hour there is run in a mixture of ethyl acetoacetate (29 parts) and xylene (20 parts). By proceeding further as in Example 2, there is obtained 2-acetonyl-5-methylbenziminazole, M. P. 155°. The yield is 59%.

*Example 7*

21.6 parts of o-phenylenediamine are dissolved in 200 parts of chlorobenzene and 0.5 part of piperidine added. The solution is boiled and stirred and a mixture of 28.6 parts ethylacetoacetate with 20 parts of chlorobenzene is run in during ½ hour. The reaction vessel is fitted with a short column and during the addition of the ester a few drops of alcohol distil off. Boiling is continued at such a rate that 50-60 parts of distillate are obtained in 1 hour after the addition of the ester. The residue on cooling deposits almost colourless needles of 2-acetonylbenziminazole. Yield 23 parts=66.2% theory. M. P. 144-146° C.

I claim:

1. A process which comprises reacting one of a group consisting of an aroylacetic ester and an alkoylacetic ester with an ortho-arylene diamine in an inert solvent in the presence of an alkaline catalyst until a benziminazole derivative is produced which is characterized by solubility in dilute caustic alkali, by ability to couple with diazo salts and by the presence of one of the group consisting of the radicals —CH₂—CO—alkyl and —CH₂—CO—aryl.

2. The process which comprises reacting one of a group consisting of an aroylacetic ester and an alkoylacetic ester with an ortho-diamine of the benzene series in an inert solvent in the presence of an alkaline catalyst until a benziminazole derivative is produced which is characterized by solubility in dilute caustic alkali, by ability to couple with diazo salts and by the presence of one of the group consisting of the radicals —CH₂—CO—alkyl and —CH₂—CO—aryl.

3. A compound represented by the formula

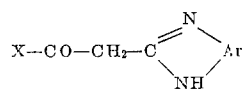

in which X is one of a group consisting of alkyl and aryl, and Ar is aryl united through adjacent positions to the two nitrogen atoms, said compound being characterized by solubility in caustic alkali solutions and by ability to couple with diazo salts.

4. The compound represented by the formula

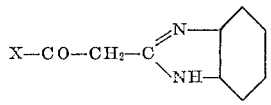

in which X is one of a group consisting of alkyl and aryl, said compound being characterized by solubility in caustic alkali solutions and by ability to couple with diazo salts.

5. The compound represented by the formula

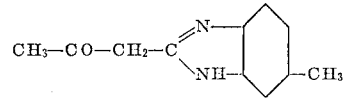

which is characterized by solubility in caustic alkali solutions and by ability to couple with diazo salts.

WILFRED ARCHIBALD SEXTON.